US008082377B2

(12) United States Patent
Toki et al.

(10) Patent No.: US 8,082,377 B2
(45) Date of Patent: Dec. 20, 2011

(54) DATA TRANSMISSION AND RECEPTION SYSTEM, MASTER DEVICE, AND SLAVE DEVICE

(75) Inventors: Masahiro Toki, Suwa (JP); Shinichi Yamada, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 12/424,181

(22) Filed: Apr. 15, 2009

(65) Prior Publication Data
US 2009/0265494 A1 Oct. 22, 2009

(30) Foreign Application Priority Data

Apr. 22, 2008 (JP) ................................. 2008-111022

(51) Int. Cl.
*G06F 13/00* (2006.01)
(52) U.S. Cl. ...................................................... 710/110
(58) Field of Classification Search .................. 710/110; 709/208; 370/276–296
See application file for complete search history.

(56) References Cited

U.S. PATENT DOCUMENTS

| 3,919,693 | A | * | 11/1975 | Anderson | 709/245 |
| 4,182,961 | A | * | 1/1980 | Dingwall | 377/117 |
| 4,301,532 | A | * | 11/1981 | Janetzky | 370/438 |
| 4,387,466 | A | * | 6/1983 | Sire | 375/214 |
| 4,621,360 | A | * | 11/1986 | Inoue | 370/438 |
| 4,782,481 | A | * | 11/1988 | Eaton | 370/438 |
| 4,810,975 | A | * | 3/1989 | Dias | 331/78 |
| 4,847,867 | A | * | 7/1989 | Nasu et al. | 375/257 |
| 4,870,401 | A | * | 9/1989 | Lee et al. | 340/5.25 |
| 4,910,509 | A | * | 3/1990 | Rabii | 340/825.52 |
| 5,345,564 | A | * | 9/1994 | Jensen et al. | 713/600 |
| 5,361,376 | A | * | 11/1994 | Cummins et al. | 710/305 |
| 5,398,238 | A | * | 3/1995 | Inagawa et al. | 370/294 |
| 5,438,614 | A | * | 8/1995 | Rozman et al. | 379/93.08 |
| 5,524,237 | A | * | 6/1996 | Bestler et al. | 713/600 |
| 5,600,803 | A | * | 2/1997 | Iitsuka et al. | 709/208 |
| 5,938,746 | A | * | 8/1999 | Ozawa et al. | 710/40 |
| 6,088,810 | A | * | 7/2000 | Ribes et al. | 713/400 |
| 6,347,351 | B1 | * | 2/2002 | Osborne et al. | 710/119 |
| 6,748,442 | B1 | * | 6/2004 | Keller | 709/232 |
| 6,922,790 | B2 | * | 7/2005 | Smith et al. | 713/600 |
| 7,656,828 | B2 | * | 2/2010 | Wenzel et al. | 370/296 |
| 2004/0133717 | A1 | * | 7/2004 | Tashiro | 710/72 |

FOREIGN PATENT DOCUMENTS

| DE | 4017482 A1 * | 1/1991 |
| JP | A-5-2538 | 1/1993 |

* cited by examiner

*Primary Examiner* — Paul Myers
(74) *Attorney, Agent, or Firm* — Oliff & Berridge, PLC (57) ABSTRACT

A master device for performing data transmission and reception with a slave device includes: a data transmission and reception circuit for performing transmission of data to the slave device and reception of data from the slave device via a first transmission path in a time division manner; and a control circuit wherein when data is transmitted or received, the control circuit provides a clock signal synchronous with the data to the slave device via a second transmission path, the control circuit provides a signal for setting a state of the slave device, to the slave device via a third transmission path while setting the clock signal at a first level, and the control circuit provides a signal for serving as a trigger for the slave device performing a predetermined operation, to the slave device via the third transmission path while setting the clock signal at a second level different from the first level.

10 Claims, 5 Drawing Sheets

FIG. 5

DATA TRANSMISSION AND RECEPTION SYSTEM, MASTER DEVICE, AND SLAVE DEVICE The entire disclosure of Japanese Patent Application No. 2008-111022, filed Apr. 22, 2008 is expressly incorporated by reference herein.

BACKGROUND

1. Technical Field

The present invention relates to a data transmission and reception system in which a master device and slave devices perform two-way data communications with each other. The invention also relates to a master device and a slave device (semiconductor integrated circuits) used in such a data transmission and reception system.

2. Related Art

For example, in a system including a central control unit and a terminal processing apparatus, the central control unit and terminal processing apparatus perform data transmission and reception with each other so as to transmit data storing such as the state of the terminal processing apparatus. In particular, in a system including multiple terminal processing apparatuses, a central control unit and each terminal processing apparatus must perform transmission and reception of data indicating the state of the terminal processing apparatus with each other. For this reason, the data transmission and reception system is configured so that the central control unit is provided with a master device and each terminal processing apparatus is provided with a slave device.

Two-way communications are effective in reducing the number of signal terminals or wire lines in such a data transmission and reception system. For example, use of three types of signals, that is, data, a clock signal, and a reset signal, allows two-way communications. Specifically, after a system is reset by activating a reset signal temporarily, a master device starts to transmit data and a clock signal to a terminal slave device. Subsequently, the master device completes the transmission in synchronization with a rising edge of an n-th (n is predetermined natural number) pulse in the clock signal. At the same time, the terminal slave device starts transmission to the master device.

However, if such a communication method is applied to a system having a configuration in which a relay slave device (also referred to as a "bridge chip") having a particular function different from that of a terminal slave device is coupled in series between a master device and the terminal slave device and the same three types of signals are used, there occurs a conflict such as one where the two slave devices simultaneously transmit transmission signals due to a difference between timings at which the two slave devices switch between transmission and reception. Such a conflict may have a negative effect, such as shortening of life, on the devices. On the other hand, if a control signal for controlling the switching of the communication direction is used, the number of signal terminals or wiring lines is increased. This is not preferable in terms of the product specification.

As a related-art example, JP-A-05-2538 (pp. 1 to 2, FIG. 1) discloses a parallel data communication method for preventing an increase in the number of control lines caused by an increase in the number of functions. In this parallel data communication method, a signal line includes multiple control lines for transmitting status information for providing notification of the operating state of an apparatus to the other devices or command information for specifying the operating state of an apparatus from another apparatus. Some of the control lines transmit a switching signal for switching the meaning of status information or command information transmitted through a data line or a remaining control line. As is understood from the above description, JP-A-05-2538 uses the multiple control signals and therefore the problem of the increase in the number of signal terminals or wiring lines is not solved.

SUMMARY

An advantage of the invention is to provide a data transmission and reception system in which two-way communications are stably performed without having to increase the number of signal terminals or wiring lines.

A master device for performing data transmission and reception with a slave device according to a first aspect of the invention includes: a data transmission and reception circuit for performing transmission of data to the slave device and reception of data from the slave device via a first transmission path in a time division manner; and a control circuit wherein when data is transmitted or received, the control circuit provides a clock signal synchronous with the data to the slave device via a second transmission path, the control circuit provides a signal for setting a state of the slave device, to the slave device via a third transmission path while setting the clock signal at a first level, and the control circuit provides a signal for serving as a trigger for the slave device performing a predetermined operation, to the slave device via the third transmission path while setting the clock signal at a second level different from the first level.

In this case, the control circuit may provide a reset signal for resetting the slave device, to the slave device via the third transmission path while setting the clock signal at the first level. Also, the control circuit may provide a chip enable signal for selecting the slave device, to the slave device via the third transmission path while setting the clock signal at the first level. Also, the control circuit may provide a signal for serving as a trigger for inverting a communication direction of the slave device, to the slave device via the third transmission path while setting the clock signal at the second level. Also, the control circuit may place the data transmission and reception circuit in transmission mode as an initial setting while setting the clock signal at the second level, subsequently may set the data transmission and reception circuit in reception mode, and subsequently may provide a signal for serving as a trigger for inverting a communication direction of the slave device, to the slave device.

A slave device for performing data transmission and reception with a master device according to a second aspect of the invention includes: a data transmission and reception circuit for performing transmission of data to the master device and reception of data from the master device via a first transmission path in a time division manner; and a control circuit wherein the control circuit controls the data transmission and reception circuit so that data is transmitted or received in synchronization with a clock signal received from the master device via a second transmission path, the control circuit sets a state of the slave device on the basis of a signal received from the master device via a third transmission path while setting the clock signal at a first level, and the control circuit performs a predetermined operation using, as a trigger, a signal received from the master device via the third transmission path while setting the clock signal at a second level different from the first level.

In this case, the control circuit may invert a communication direction of the data transmission and reception circuit using, as a trigger, a signal received from the master device via the third transmission path while setting the clock signal at the second level. Also, the slave device may further include a second data transmission and reception circuit for performing transmission of data to a second slave device and reception of data from the second slave device via one transmission path in a time division manner. The control circuit may relay a clock signal to the second slave device, and while setting the clock signal at a second level, the control circuit may mask a change in level of a signal received from the master device via the third transmission path and relays the signal to the second slave device. Also, the second slave device may obtain a count value by counting the number of pulses included in a clock signal and may invert a communication direction on the basis of the count value.

A data transmission and reception system according to a third aspect of the invention includes the master device according to the first aspect of the invention and the slave device according to the second aspect of the invention.

By adopting the above-mentioned aspects of the invention, a signal for serving as a trigger for the slave device performing a predetermined operation is provided to the slave device while setting the clock signal at the second level different from the first level. Thus, the communication direction of the slave device is inverted using this signal as a trigger. As a result, two-way communications are stably performed without having to increase the number of signal terminals or wiring lines.

BRIEF DESCRIPTION OF THE DRAWINGS

The invention will be described with reference to the accompanying drawings, wherein like reference numerals designate like elements.

DESCRIPTION OF EXEMPLARY EMBODIMENTS

Now, embodiments of the invention will be described in detail with reference to the accompanying drawings. Like elements are assigned like reference numerals and will not be repeatedly described.

Figure 1:
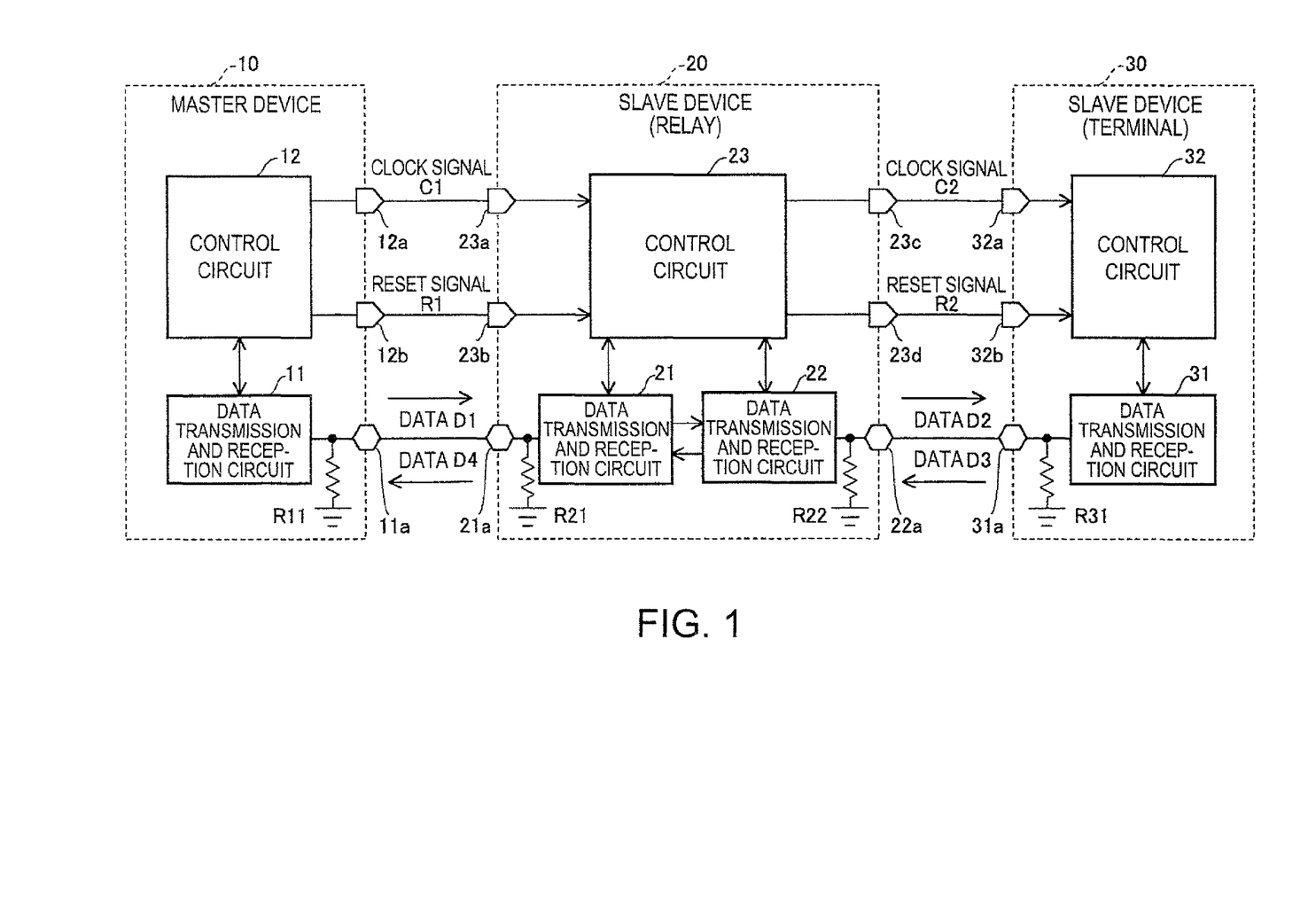
FIG. 1 is a block diagram showing a configuration of a data transmission and reception system according to a first embodiment of the invention.

FIG. 1 is a block diagram showing a configuration of a data transmission and reception system according to a first embodiment of the invention. The data transmission and reception system according to this embodiment includes a central control unit and multiple terminal processing apparatuses, and the central control unit and terminal processing apparatuses perform data transmission and reception with each other.

In the data transmission and reception system according to this embodiment, the central control unit is provided with a master device 10 and each terminal processing apparatus is provided with a terminal slave device 30 (only one terminal slave device 30 is shown in FIG. 1). Also, the data transmission and reception system includes a relay slave device (bridge chips) 20 disposed between the master device 10 and the terminal slave device 30. In this data transmission and reception system, the slave device 30 transmits information indicating such as the state of the corresponding terminal processing apparatus to the master device 10 in response to a command transmitted from the master device 10.

The master device 10 includes a data transmission and reception circuit 11 for performing data transmission and reception with the slave device 20, a resistance R11 and an output terminal 11a both coupled to the data transmission and reception circuit 11, a control circuit for generating a clock signal C1 for transmission and reception in synchronization with a clock signal provided from the central control unit so as to control the data transmission and reception circuit 11 and generating a signal (a signal that does not change during one transmission or reception) for setting the state of the slave device 20 and/or the slave device 30, and an output terminal 12a and 12b both coupled to the control circuit 12. In the first embodiment, a reset signal R1 for resetting (initializing) the whole data transmission and reception system including the slave device 20 and the slave device 30 is used as a signal for setting the state of the slave device 20 and/or the slave device 30.

Figure 2:
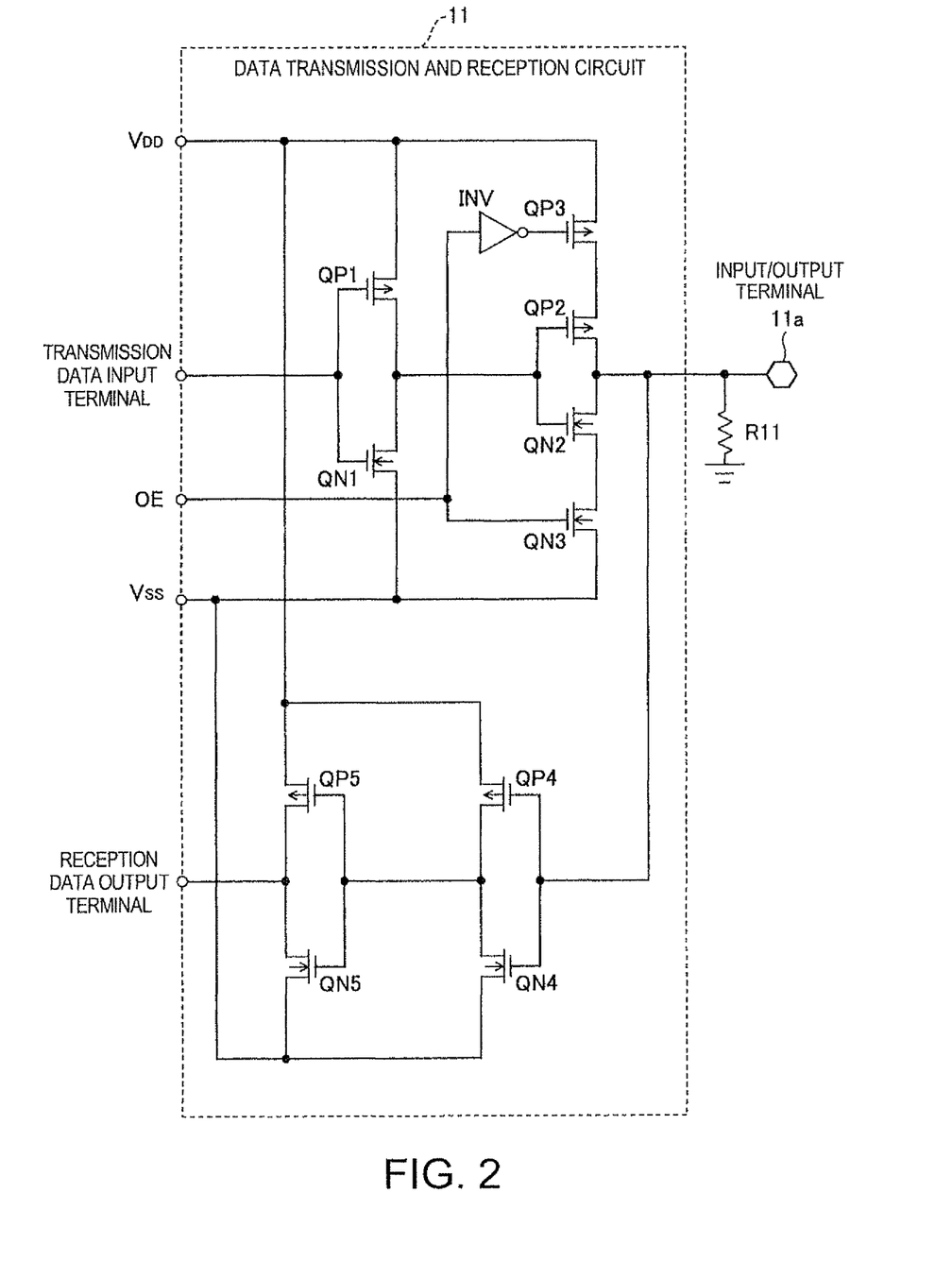
FIG. 2 is a circuit diagram showing a specific example of a configuration of a data transmission and reception circuit shown in FIG. 1.

FIG. 2 is a circuit diagram showing a specific example of a configuration of the data transmission and reception circuit shown in FIG. 1. The data transmission and reception circuit 11 includes a transmission circuit including p-channel transistors QP1 to QP3, n-channel transistors QN1 to QN3, and an inverter INV, and a reception circuit including p-channel transistors QP4 to QP5 and n-channel transistors QN4 to QN5. The data transmission and reception circuit 11 operates when a power supply potential $V_{DD}$ (high level) and a power supply potential $V_{SS}$ (low level) are provided thereto.

In the transmission circuit, transmission data inputted into a transmission data input terminal is inverted by a first inverter including the transistors QP1 and QN1 and then inverted by a second inverter including the transistors QP2 to QP3 and transistors QN2 to QN3. The second inverter is a so-called "tri-state buffer" circuit. When a control signal OE is activated to a high level in transmission mode, the second inverter outputs high-level or low-level transmission data to the input/output terminal 11a. When the control signal OE is deactivated to a low level in reception mode, the second inverter provides the output with a high impedance. Since the resistance R11 is coupled between the input/output terminal 11a and a ground potential, the input/output terminal 11a becomes the ground potential when the output of the transmission circuit is provided with a high impedance.

In the reception circuit, reception data inputted into the input/output terminal 11a is inverted by a first inverter including the transistors QP4 and QN4, then inverted by a second inverter including the transistors QP5 and QN5, and then outputted to a reception data output terminal.

Back in FIG. 1, the data transmission and reception circuit 11 performs transmission of data D1 to the slave device 20 and reception of data D4 therefrom via a first transmission path in a time division manner.

When data is transmitted or received, the control circuit 12 provides a clock signal C1 synchronous with the data to the slave device 20 via a second transistor path. The control circuit 12 is allowed to set the clock signal C1 at a first level or a second level. While setting the clock signal C1 at the first level, the control circuit 12 provides a reset signal R1 for resetting the data transmission and reception system, to the slave device 20 via a third transmission path. On the other hand, while setting the clock signal C1 at the second level different from the first level, the control circuit 12 uses the reset signal R1 as a signal for serving as a trigger for causing the slave device 20 to perform a predetermined operation.

In the first embodiment, while setting the clock signal C1 at the second level, the control circuit 12 uses the reset signal R1 as a signal for serving as a trigger for inverting the communication direction of the slave device 20. In the following description, it is assumed that the first level of the clock signal C1 is a low level, the second level thereof is a high level, and the reset signal R1 is active low.

For example, while setting the clock signal C1 at a low level, the control circuit 12 activates the reset signal R1 to a low level temporarily so as to reset the data transmission and reception system. Subsequently, the control circuit 12 places the data transmission and reception circuit 11 in transmission node. On the other hand, when the slave device 20 is reset, it is placed in a mode for receiving data from the master device 10. Thus, the master device 10 transmits data (command) to the slave device 20.

Subsequently, the control circuit 12 places the data transmission and reception circuit 11 in reception mode. Subsequently, the control circuit 12 sets the clock signal C1 at a high level so as to temporarily activate the reset signal R1 to a low level. Thus, the communication direction of the slave device 20 is inverted so that the slave device 20 is placed in a mode for transmitting data to the master device 10. Thus, the slave device 20 transmits data (information indicating such as the state of the terminal processing apparatus) to the master device 10.

The slave device 20 includes a data transmission and reception circuit 21 for performing data transmission and reception with the master device 10, a resistance R21 and an input/output terminal 21a both coupled to the data transmission and reception circuit 21, a data transmission and reception circuit 22 for performing data transmission and reception with the slave device 30, a resistance R22 and an input/output terminal 22a both coupled to the data transmission and reception circuit 22, a control circuit 23 for controlling the data transmission and reception circuits 21 and 22, and input terminal 23a to 23b coupled to the control circuit 23 and output terminals 23c to 23d coupled thereto.

The data transmission and reception circuit 21 performs reception of the data D1 from the master device 10 and transmission of the data D4 to the master device 10 via the first transmission path in a time division manner. The data transmission and reception circuit 22 performs transmission of data D2 to the slave device 30 and reception of data D3 from the slave device 30 via one transmission path in a time division manner. The data transmission and reception circuits 21 and 22 each have a configuration similar to that of the data transmission and reception circuit shown in FIG. 2.

The control circuit 23 controls the data transmission and reception circuits 21 and 22 so that data is transmitted or received in synchronization with the clock signal C1 received from the master device 10 via the second transmission path. While setting the clock signal C1 at a low level, the control circuit 23 sets (resets) the state of the slave device 20 on the basis of the reset signal R1 received from the master device 10 via the third transmission; while setting the clock signal C1 at a high level, the control circuit 23 performs a predetermined operation using, as a trigger, the reset signal R1 received from the master device 10 via the third transmission path.

In the first embodiment, while setting the clock signal C1 at a high level, the control circuit 23 inverts the communication directions of the data transmission and reception circuits 21 and 22 using, as a trigger, the reset signal R1 received from the master device 10 via the third transmission path. For example, as an initial setting after a reset, the data transmission and reception circuit 21 is placed in reception mode and the data transmission and reception circuit 22 is placed in transmission mode. When the communication directions thereof are inverted, the data transmission and reception circuit 21 is placed in transmission mode and data transmission and reception circuit 22 is placed in reception mode.

Shown below are a logical expression for obtaining a system reset signal SRT (low active) for resetting the state of the slave device 20 and a logical expression for obtaining a DDC signal (high active) for inverting the communication direction of data on the basis of the clock signal C1 and reset signal R1 (low active). In the expressions, [OR] represents an OR operation, [AND] represents an AND operation, and [NOT] represents inversion.

$SRT=C1[OR]R1$ $DDC=C1[AND]([NOT]R1)$

Also, the control circuit 23 relays the clock signal C1 to the slave device 30 as a clock signal C2 by buffering the clock signal C1. Also, while setting the clock signal C1 at a high level, the control circuit 23 masks a change in level of the reset signal R1 received from the master device 10 via the third transmission path and relays the reset signal R1 to the slave device 30 as a reset signal R2.

The terminal slave device 30 includes a data transmission and reception circuit 31 for performing data transmission and reception with the slave device 20, a resistance 31 and an input/output terminal 31a both coupled to the data transmission and reception circuit 31, a control circuit 32 for controlling the data transmission and reception circuit 31, and input terminals 32a to 32b coupled to the control circuit 32.

The data transmission and reception circuit 31 performs reception of the data D2 from the slave device 20 and transmission of the data D3 to the slave device 20 via one transmission path in a time division manner. The data transmission and reception circuit 31 has a configuration similar to that of the data transmission and reception circuit shown in FIG. 2.

The control circuit 32 resets the state of the slave device 30 on the basis of the received reset signal R2. Subsequently, the control circuit 32 controls the data transmission and reception circuit 31 so that data is transmitted or received in synchronization with the clock signal C2, and obtains a count value by counting the number of negative pulses included in the clock signal C2 and then inverts the communication direction of the data transmission and reception circuit 31 on the basis of the obtained count value. For example, as an initial setting after a reset, the data transmission and reception circuit 31 is placed in reception mode. When the communication direction thereof is inverted, the data transmission and reception circuit 31 is placed in transmission mode.

Figure 3:
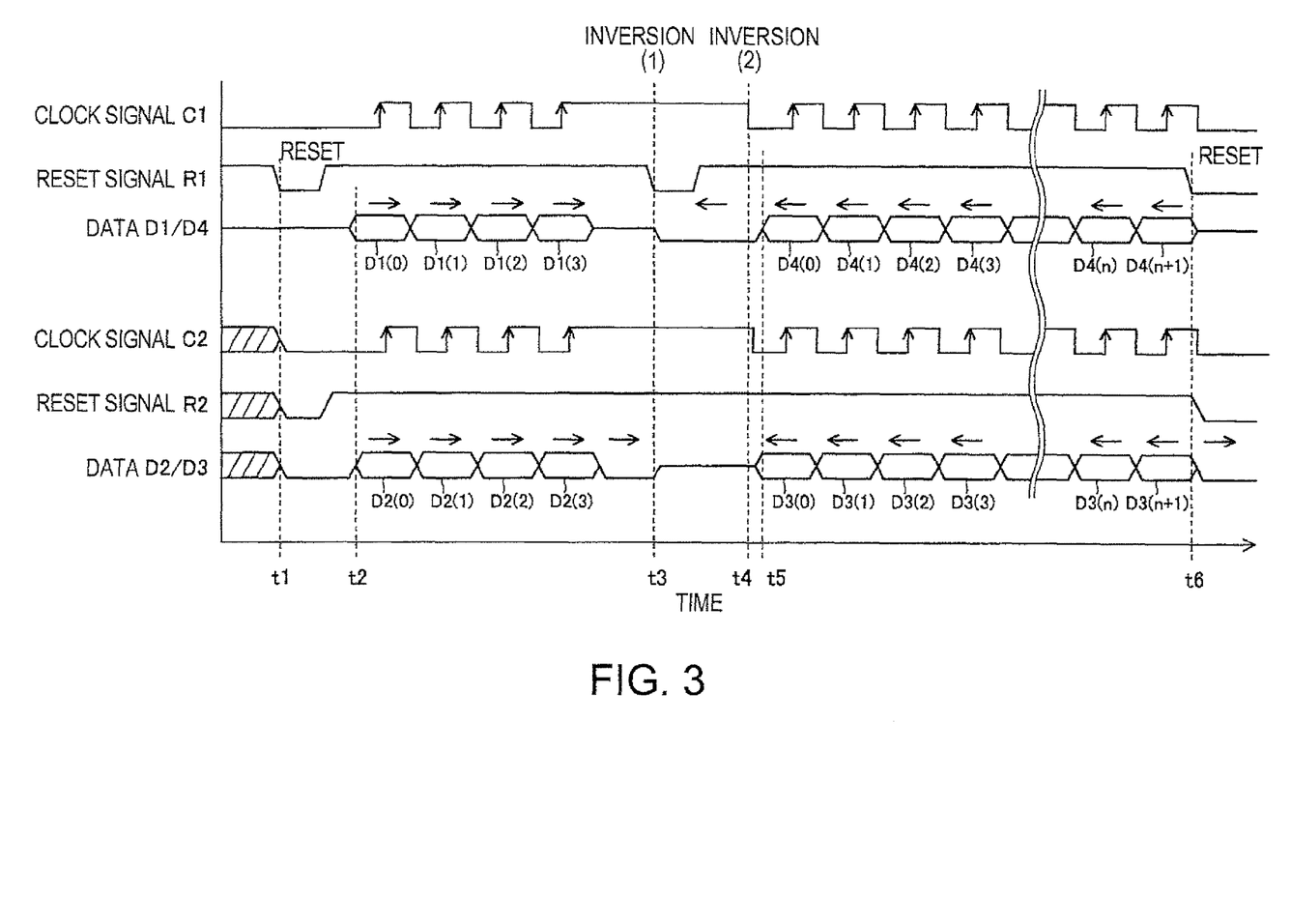
FIG. 3 is a timing chart showing waveforms of signals of the data transmission and reception system shown in FIG. 1.

Next, operations performed in the data transmission and reception system shown in FIG. 1 will be described in detail. FIG. 3 is a timing chart showing waveforms of the signals of the data transmission and reception system shown in FIG. 1. In the data transmission and reception circuit shown in FIG. 2, it is assumed that the power supply potential $V_{SS}$ is typically a ground potential. On the other hand, in FIG. 3, in order to distinguish a period (transmission mode) in which the output of the transmission circuit is set at a low level from a period (reception mode) in which the output of the transmission circuit has a high impedance, it is assumed that the power supply potential $V_{SS}$ (low level) is a negative potential.

As shown in FIG. 3, in the master device 10, initially, the clock signal C1 is set at a low level and the data transmission and reception circuit 11 is placed in reception mode. In the slave device 20, the data transmission and reception circuit 21 is placed in reception mode and data transmission and reception circuit 22 is placed in transmission mode. In the slave device 30, the data transmission and reception circuit 31 is placed in reception mode.

At time t1, the master device 10 activates the reset signal R1 to a low level. Thus, the slave device 20 also activates the reset signal R2 to a low level so that the data transmission and reception system is reset. When the slave device 30 is reset, the control circuit 32 initializes the count value of negative pulses included in the clock signal C2 to zero.

Subsequently, the reset state is cancelled. At time t2, the control circuit 12 of the master device 10 places the data transmission and reception circuit 11 in transmission mode. The data transmission and reception circuit 11 of the master device 10 starts transmission of the data D1 in synchronization with the clock signal C1 and the data transmission and reception circuit 21 of the slave device 20 receives the data D1 in synchronization with the clock signal C1. Also, the data transmission and reception circuit 22 of the slave device 20 starts transmission of the data D2 in synchronization with the clock signal C2 and the data transmission and reception circuit 31 of the slave device 30 receives the data D2 in synchronization with the clock signal C2. In this way, the master device 10 transmits the series of pieces of data D1 (0) to D1 (3) and the slave device 20 transmits the series of pieces of data D2 (0) to D2 (3).

When the master device 10 completes the transmission of the data D1, the control circuit 12 places the data transmission and reception circuit 11 in reception mode. Subsequently, at time t3, the control circuit 12 activates the reset signal R1 to a low level while setting the clock signal C1 at a high level. Thus, in the slave device 20, the data transmission and reception circuit 21 is placed in transmission mode and the data transmission and reception circuit 22 is placed in reception mode. As is understood from the above description, the data transmission and reception circuit 11 of the master device 10 is placed in reception mode and, after the lapse of a certain time, the data transmission and reception circuit 21 of the slave device 20 is placed in transmission mode. This prevents the data transmission and reception circuit 11 of the master device 10 and the data transmission and reception circuit 21 of the slave device 20 from being placed in transmission mode simultaneously.

At time t4, the clock signal C2 rises. At this time, in the slave device 30, the count value of the negative pulses included in the clock signal C2 reaches a predetermined value (4). At time t5, the control circuit 32 places the data transmission and reception circuit 31 in transmission mode. As is understood from the above description, the data transmission and reception circuit 22 of the slave device 20 is placed in reception mode and, after the lapse of a certain time, the data transmission and reception circuit 31 of the slave device 30 is placed in transmission mode. This prevents the data transmission and reception circuit 22 of the slave device 20 and the data transmission and reception circuit 31 of the slave device 30 from being placed in transmission mode simultaneously.

The data transmission and reception circuit 31 of the slave device 30 starts transmission of the data D3 in synchronization with the clock signal C2 and the data transmission and reception circuit 22 of the slave device 20 receives the data D3 in synchronization with the clock signal C2. Also, the data transmission and reception circuit 21 of the slave device 20 starts transmission of the data D4 in synchronization with the clock signal C1 and the data transmission and reception circuit 11 of the master device 10 receives the data D4 in synchronization with the clock signal C1. In this way, the slave device 30 transmits the series of pieces of data D3 (0) to D3 (n+1) and the slave device 20 transmits the series of pieces of data D4 (0) to D4 (n+1).

When the master device 10 completes the reception of the data D4, that is, at time t6, the control circuit 12 activates the reset signal R1 to a low level while setting the clock signal C1 at a low level. At that time, the slave device 20 also activates the reset signal R2 to a low level. Thus, the transmission and reception operations in the data transmission and reception system are reset.

Figure 4:
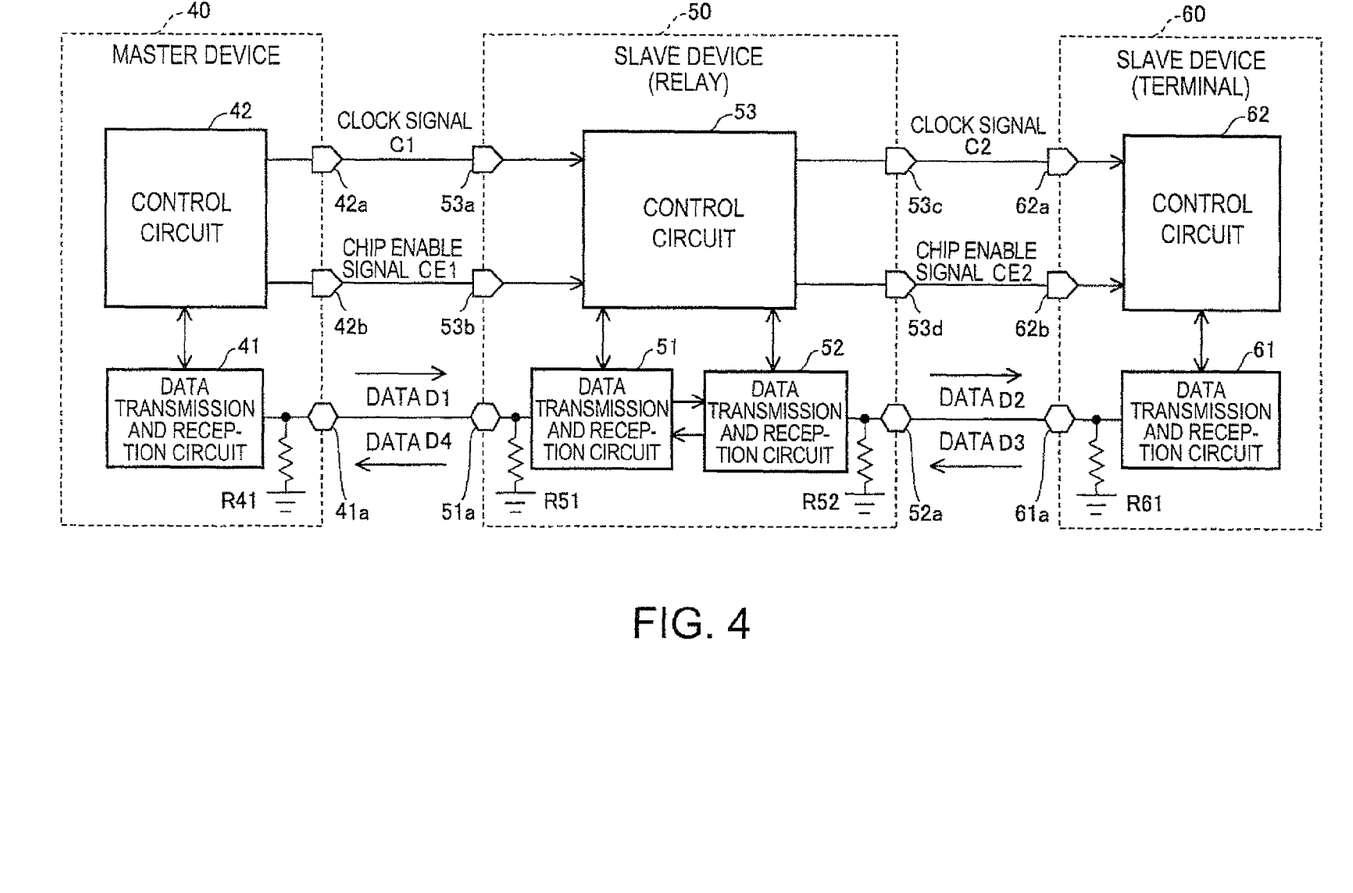
FIG. 4 is a block diagram showing a configuration of a data transmission and reception system according to a second embodiment of the invention.

Next, a second embodiment of the invention will be described. FIG. 4 is a block diagram showing a configuration of a data transmission and reception system according to the second embodiment. As shown in FIG. 4, this data transmission and reception system includes a master device 40 provided in a central control unit, a relay slave device 50 (bridge chip), and a terminal slave device 60 (only one slave device 60 is shown in FIG. 4) provided in terminal processing apparatuses. In this data transmission and reception system, for example, the slave device 60 transmits information indicating such as the state of the terminal processing apparatus to the master device 40 in response to a command transmitted from the master device 40.

The master device 40 includes a data transmission and reception circuit 41 for performing data transmission and reception with the slave device 50, a resistance R41 and an output terminal 41a both coupled to the data transmission and reception circuit 41, a control circuit 42 for generating a clock signal C1 for transmission and reception in synchronization with a clock signal provided from the central control unit so as to control the data transmission and reception circuit 41 and generating a signal for setting the state of the slave device 50 and/or the slave device 60, and output terminals 42a and 42b coupled to the control circuit 42. In the second embodiment, a chip enable signal for selecting the slave device 60 is used as a signal for setting the state of the slave device 50 and/or the slave device 60.

The data transmission and reception circuit 41 performs transmission of data D1 to the slave device 50 and reception of data D4 from the slave device 50 via a first transmission path in a time division manner. The data transmission and reception circuit 41 has a configuration similar to that of the data transmission and reception circuit shown in FIG. 2.

When data is transmitted or received, the control circuit 42 provides the clock signal C1 synchronous with the data to the slave device 50 via a second transistor path. The control circuit 42 is allowed to set the clock signal C1 at a first level or a second level, and provides a chip enable signal CE1 for selecting the slave device 50 to the slave device 50 via a third transmission path while setting the clock signal C1 at the first level. On the other hand, while setting the clock signal C1 at the second level different from the first level, the control circuit 42 uses the chip enable signal CE1 as a signal for serving as a trigger for the slave device 50 performing a predetermined operation.

In the second embodiment, while setting the clock signal C1 at the second level, the control circuit 42 uses the chip enable signal CE1 as a signal for serving as a trigger for inverting the communication direction of the slave device 50. In the following description, it is assumed that the first level of the clock signal C1 is a high level, the second level thereof is a low level, and the chip enable signal CE1 is low active.

For example, while setting the clock signal C1 at a high level, the control circuit 42 changes the chip enable signal CE1 from a high level to a low level so as to select the slave device 60. Subsequently, the control circuit 42 sets the data transmission and reception circuit 41 to transmission mode. Here, it is assumed that when the chip enable signal CE1 is activated while setting the clock signal C1 at a high level, the slave device 50 selects one of the multiple slave device 60 one after another. As an initial setting, the slave device 50 is placed in a mode for receiving data from the master device 40. Thus, the master device 40 transmits data (command) to the slave device 50.

Subsequently, the control circuit 42 places the data transmission and reception circuit 41 in reception mode. Subsequently, the control circuit 12 sets the clock signal C1 at a low level so as to activate the chip enable signal CE1 to a high level temporarily. Thus, the communication direction of the slave device 50 is inverted so that the slave device 50 is placed in a mode for transmitting data to the master device 40. Thus, the slave device 50 transmits data (information indicating such as the state of the terminal processing apparatus) to the master device 40.

The relay slave device 50 includes a data transmission and reception circuit 51 for performing data transmission and reception with the master device 40, a resistance R51 and an input/output terminal 51a both coupled to the data transmission and reception circuit 51, a data transmission and reception circuit 52 for performing data transmission and reception with the slave device 60, a resistance R52 and an input/output terminal 52a both coupled to the data transmission and reception circuit 52, a control circuit 53 for controlling the data transmission and reception circuits 51 and 52, and input terminal 53a to 53b coupled to the control circuit 53 and output terminals 53c to 53d coupled thereto.

The data transmission and reception circuit 51 performs reception of the data D1 from the master device 40 and transmission of the data D4 to the master device 40 via the first transmission path in a time division manner. The data transmission and reception circuit 52 performs transmission of the data D2 to the slave device 60 and reception of the data D3 from the slave device 60 via one transmission path in a time division manner. The data transmission and reception circuits 21 and 22 each have a configuration similar to that of the data transmission and reception circuit shown in FIG. 2.

The control circuit 53 controls the data transmission and reception circuits 51 and 52 so that data is transmitted or received in synchronization with the clock signal C1 received from the master device 40 via the second transmission path. While setting the clock signal C1 at a high level, the control circuit 53 sets (selects) the state of the slave device 60 on the basis of the chip enable signal CE1 received from the master device 40 via the third transmission. Also, while setting the clock signal C1 at a low level, the control circuit 53 performs a predetermined operation using, as a trigger, the chip enable signal CE1 received from the master device 40 via the third transmission path.

In the second embodiment, while setting the clock signal C1 at a low level, the control circuit 53 inverts the communication directions of the data transmission and reception circuits 51 and 52 using, as a trigger, the chip enable signal CE1 received from the master device 40 via the third transmission path. For example, as an initial setting, the data transmission and reception circuit 51 is placed in reception mode and the data transmission and reception circuit 52 is placed in transmission mode. When the communication directions thereof are inverted, the data transmission and reception circuit 51 is placed in transmission mode and data transmission and reception circuit 52 is placed in reception mode.

Shown below are a logical expression for obtaining a system chip enable signal SCE (low active) for selecting the slave device 50 and a logical expression for obtaining a DDC signal (high active) for inverting the communication direction of data, on the basis of the clock signal C1 and chip enable signal CE1 (low active). In the logical expressions, [AND] represents an AND operation and [NOT] represents inversion.

$SCE=C1[AND]CE1$ $DDC=([NOT]C1)[AND]CE1$

Also, the control circuit 53 relays the clock signal C1 to the slave device 60 as a clock signal C2 by buffering the clock signal C1. Further, while setting the clock signal C1 at a low level, the control circuit 23 masks a change in level of the chip enable signal CE1 received from the master device 40 via the third transmission path and relays the signal to the slave device 60 as a chip enable signal CE2.

Each terminal slave device 60 includes a data transmission and reception circuit 61 for performing data transmission and reception with the slave device 50, a resistance 61 and an input/output terminal 61a both coupled to the data transmission and reception circuit 61, a control circuit 62 for controlling the data transmission and reception circuit 61, and input terminals 62a to 62b coupled to the control circuit 62.

The data transmission and reception circuit 61 performs reception of the data D2 from the slave device 50 and transmission of the data D3 to the slave device 50 via one transmission path in a time division manner. The data transmission and reception circuit 61 has a configuration similar to that of the data transmission and reception circuit shown in FIG. 2.

The control circuit 62 controls the data transmission and reception circuit 61 so that data is received or transmitted in synchronization with the clock signal C2. Also, the control circuit 62 obtains the count value by counting the number of positive pulses included in the clock signal C2 and inverts the communication direction of the data transmission and reception circuit 61 on the basis of the obtained count value. For example, as an initial setting, the data transmission and reception circuit 61 is placed in reception mode. When the communication direction thereof is inverted, the data transmission and reception circuit 61 is placed in transmission mode.

Figure 5:
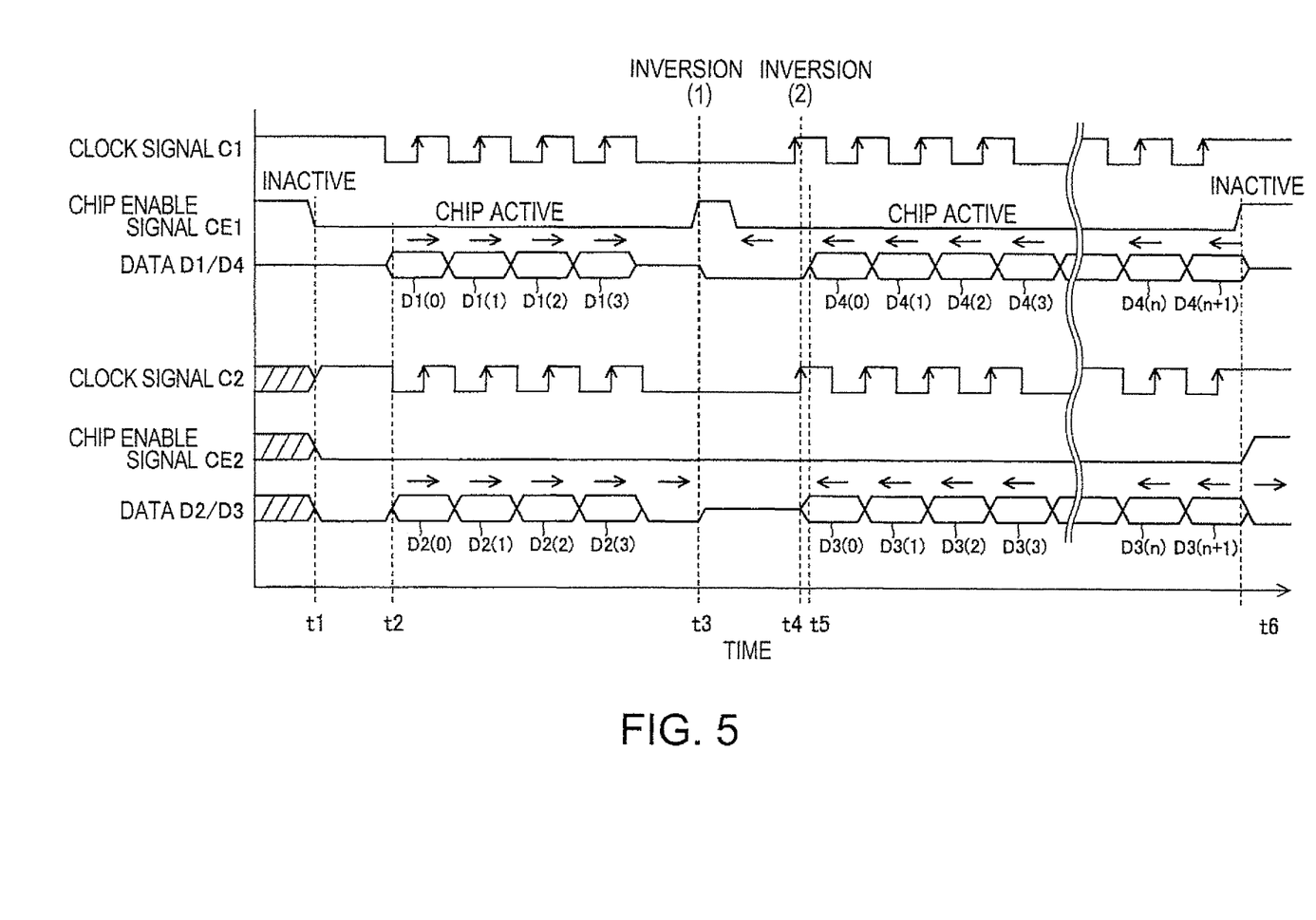
FIG. 5 is a timing chart showing waveforms of signals of the data transmission and reception system shown in FIG. 4.

Next, the operations performed by the data transmission and reception system shown in FIG. 4 will be described in detail. FIG. 5 is a timing chart showing waveforms of the signals of the data transmission and reception system shown in FIG. 4.

As shown in FIG. 5, in the master device 40, initially, the clock signal C1 is set at a high level and the data transmission and reception circuit 41 is placed in reception mode. In the slave device 50, the data transmission and reception circuit 51 is placed in reception mode and data transmission and reception circuit 52 is placed in transmission mode. In the slave device 60, the data transmission and reception circuit 61 is placed in reception mode.

At time t1, the master device 40 changes the chip enable signal CE1 from a high level (inactive) to a low level (chip active). Thus, the slave device 50 also activates the chip enable signal CE2 to a low level so as to select the slave device 60. When the slave device 60 is selected, the control circuit 62 initializes the count value of positive pulses included in the clock signal C2 to zero.

Subsequently, the reset state is cancelled. At time t2, the control circuit 42 of the master device 40 places the data transmission and reception circuit 41 in transmission mode. The data transmission and reception circuit 41 of the master device 40 starts transmission of the data D1 in synchronization with the clock signal C1 and the data transmission and reception circuit 51 of the slave device 50 receives the data D1 in synchronization with the clock signal C1. Also, the data transmission and reception circuit 52 of the slave device 50 starts transmission of the data D2 in synchronization with the clock signal C2 and the data transmission and reception circuit 61 of the slave device 60 receives the data D2 in synchronization with the clock signal C2. In this way, the master device 40 transmits the series of pieces of data D1 (0) to D1 (3) and the slave device 50 transmits the series of pieces of data D2 (0) to D2 (3).

When the master device 40 completes the transmission of the data D1, the control circuit 42 places the data transmission and reception circuit 41 to reception mode. Subsequently, at time t3, the control circuit 42 temporarily deactivates the chip enable signal CE1 to a high level while setting the clock signal C1 at a low level. Thus, in the slave device 50, the data transmission and reception circuit 51 is placed in transmission mode and the data transmission and reception circuit 52 is placed in reception mode. As is understood from the above description, the data transmission and reception circuit 41 of the master device 40 is placed in reception mode and, after the lapse of a certain time, the data transmission and reception circuit 51 of the slave device 50 is placed in transmission mode. This prevents the data transmission and reception circuit 41 of the master device 40 and the data transmission and reception circuit 51 of the slave device 50 from being placed in transmission mode simultaneously.

At time t4, the clock signal C2 rises. At that time, in the slave device 60, the count value of positive pulses included in the clock signal C2 reaches a predetermined value (5). At time t5, the control circuit 62 places the data transmission and reception circuit 61 in transmission mode. As is understood from the above description, the data transmission and reception circuit 52 of the slave device 50 is placed in reception mode and, after the lapse of a certain time, the data transmission and reception circuit 61 of the slave device 60 is placed in transmission mode. This prevents the data transmission and reception circuit 52 of the slave device 50 and the data transmission and reception circuit 61 of the slave device 60 from being placed in transmission mode simultaneously.

The data transmission and reception circuit 61 of the slave device 60 starts transmission of the data D3 in synchronization with the clock signal C2 and the data transmission and reception circuit 52 of the slave device 50 receives the data D3 in synchronization with the clock signal C2. Also, the data transmission and reception circuit 51 of the slave device 50 starts transmission of the data D4 in synchronization with the clock signal C1 and the data transmission and reception circuit 41 of the master device 40 receives the data D4 in synchronization with the clock signal C1. In this way, the slave device 60 transmits the series of pieces of data D3 (0) to D3 (n+1) and the slave device 50 transmits the series of pieces of data D4 (0) to D4 (n+1).

When the master device 40 completes the transmission of the data D4, that is, at time t6, the control circuit 42 deactivates the chip enable signal CE1 to a high level while setting the clock signal C1 at a high level. The slave device 50 also deactivates the chip enable signal CE2 to a high level. Thus, the series of transmission and reception operations with respect to the slave device 60 are completed.

While a case where the communication direction of the slave device is inverted has been described as an example in which the slave device is caused to perform a predetermined operation, the invention is not limited thereto and is applicable to cases where a slave device performs various operations. For example, the slave device may be configured so that, while setting the clock signal at the second level, the slave device performs a calculation process using provided data of any width using, as a trigger, a signal received from the master device via the third transmission path. As a specific example, in FIG. 3, the slave device 20 may perform an addition process on a three-bit value provided from the slave device 30 as the pieces of data D3 (1) to D3 (3), and transmits the obtained result to the master device 10.

What is claimed is:

1. A master device for performing data transmission and reception with a slave device, the master device comprising:
   a data transmission and reception circuit for performing transmission of data to the slave device and reception of data from the slave device via a first transmission path in a time division manner; and
   a control circuit wherein when data is transmitted or received, the control circuit provides a clock signal synchronous with the data to the slave device via a second transmission path, the control circuit provides a signal for setting a state of the slave device, to the slave device via a third transmission path while setting the clock signal at a first level, and the control circuit provides a signal for serving as a trigger for the slave device performing a predetermined operation, to the slave device via the third transmission path while setting the clock signal at a second level different from the first level, wherein
   the slave device includes a second data transmission and reception circuit for performing transmission of data to a second slave device and reception of data from the second slave device via one transmission path in a time division manner and a second control circuit,
   the second control circuit relays a clock signal to the second slave device, and while setting the clock signal at a second level, the second control circuit masks a change in level of a signal received from the master device via the third transmission path and relays the signal to the second slave device,
   the second slave device obtains a count value by counting the number of pulses included in a clock signal and inverts a communication direction on the basis of the count value, and
   the communication direction of the second slave device is inverted based on the count value after a communication direction of the slave device is inverted.

2. The master device according to claim 1, wherein
   the control circuit provides a reset signal for resetting the slave device, to the slave device via the third transmission path while setting the clock signal at the first level.

3. The master device according to claim 1, wherein
   the control circuit provides a chip enable signal for selecting the slave device, to the slave device via the third transmission path while setting the clock signal at the first level.

4. The master device according to claim 1, wherein
   the control circuit provides a signal for serving as a trigger for inverting a communication direction of the slave device, to the slave device via the third transmission path while setting the clock signal at the second level.

5. The master device according to claim 4, wherein
   the control circuit places the data transmission and reception circuit in transmission mode as an initial setting, subsequently sets the data transmission and reception circuit in reception mode, while setting the clock signal at the second level, and subsequently provides a signal for serving as a trigger for inverting a communication direction of the slave device, to the slave device.

6. A data transmission and reception system comprising:
   the master device according to claim 1; and a slave device for performing data transmission and reception with a master device, the slave device comprising:
a data transmission and reception circuit for performing transmission of data to the master device and reception of data from the master device via a first transmission path in a time division manner; and
a control circuit wherein the control circuit controls the data transmission and reception circuit so that data is transmitted or received in synchronization with a clock signal received from the master device via a second transmission path, the control circuit sets a state of the slave device on the basis of a signal received from the master device via a third transmission path while setting the clock signal at a first level, and the control circuit performs a predetermined operation using, as a trigger, a signal received from the master device via the third transmission path while setting the clock signal at a second level different from the first level.

7. The master device according to claim 1, wherein the second transmission path that transmits the clock signal and the third transmission path that transmits a reset signal are unidirectional in a direction from the master to the slave, and the first transmission path that transmits data is bidirectional.

8. A slave device for performing data transmission and reception with a master device, the slave device comprising:
a data transmission and reception circuit for performing transmission of data to the master device and reception of data from the master device via a first transmission path in a time division manner;
a control circuit wherein the control circuit controls the data transmission and reception circuit so that data is transmitted or received in synchronization with a clock signal received from the master device via a second transmission path, the control circuit sets a state of the slave device on the basis of a signal received from the master device via a third transmission path while setting the clock signal at a first level, and the control circuit performs a predetermined operation using, as a trigger, a signal received from the master device via the third transmission path while setting the clock signal at a second level different from the first level; and
a second data transmission and reception circuit for performing transmission of data to a second slave device and reception of data from the second slave device via one transmission path in a time division manner, wherein
the control circuit relays a clock signal to the second slave device, and while setting the clock signal at a second level, the control circuit masks a change in level of a signal received from the master device via the third transmission path and relays the signal to the second slave device,
the second slave device obtains a count value by counting the number of pulses included in a clock signal and inverts a communication direction on the basis of the count value, and
the communication direction of the second slave device is inverted based on the count value after a communication direction of the slave device is inverted.

9. The slave device according to claim 8, wherein
the control circuit inverts a communication direction of the data transmission and reception circuit using, as a trigger, a signal received from the master device via the third transmission path while setting the clock signal at the second level.

10. The slave device according to claim 8, wherein the second transmission path that transmits the clock signal and the third transmission path that transmits a reset signal are unidirectional in a direction from the master to the slave, and the first transmission path that transmits data is bidirectional.

* * * * *